US007619132B2

(12) United States Patent
Topolkaraev et al.

(10) Patent No.: US 7,619,132 B2
(45) Date of Patent: Nov. 17, 2009

(54) DEGRADABLE BREATHABLE MULTILAYER FILM WITH IMPROVED PROPERTIES AND METHOD OF MAKING SAME

(75) Inventors: Vasily A. Topolkaraev, Appleton, WI (US); Patrick Martin Downey, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/027,797

(22) Filed: Dec. 30, 2004

(65) Prior Publication Data

US 2006/0149200 A1 Jul. 6, 2006

(51) Int. Cl.
 *A61F 13/15* (2006.01)
 *D04H 1/00* (2006.01)
 *B32B 27/12* (2006.01)
 *B32B 3/28* (2006.01)

(52) U.S. Cl. .............................. 604/378; 604/385.101; 604/367; 604/365; 604/370; 604/368; 442/362; 442/392; 442/361; 442/334; 428/182; 428/184

(58) Field of Classification Search ................. 604/378, 604/379, 385.101, 367, 365, 370, 368; 442/327, 442/394, 362, 361; 428/332, 480, 323, 325, 428/184, 182, 370, 373, 374, 375
See application file for complete search history.

(56) References Cited

U.S. PATENT DOCUMENTS

| | | | |
|---|---|---|---|
| 3,051,453 A | 8/1962 | Sluijters | |
| 3,576,707 A | 4/1971 | Schrenk et al. | |
| 3,881,489 A | 5/1975 | Hartwell et al. | |
| 4,018,954 A | 4/1977 | Fukushima et al. | |
| 5,026,363 A | 6/1991 | Pratt | |
| 5,097,004 A | 3/1992 | Gallagher et al. | |
| 5,141,783 A * | 8/1992 | Corsi et al. .............. | 427/412.5 |
| 5,190,533 A | 3/1993 | Blackburn | |

(Continued)

FOREIGN PATENT DOCUMENTS

EP 0 652 102 B1 5/1995

(Continued)

OTHER PUBLICATIONS

Y. Hu, V. Topolkaraev, A. Hiltner, E. Baer; "Measurement of Water Vapor Transmission Rate in Highly Permeable Films"; Journal of Applied Polymer Science, vol. 81: 1624-1633, 2001; 10 pages.

(Continued)

*Primary Examiner*—Jacqueline F. Stephens
(74) *Attorney, Agent, or Firm*—Jonathan P. Taylor; Rashad L. Morgan; Vincent T. King

(57) ABSTRACT

A multilayer film includes a plastic layer and an elastomeric layer. The plastic layer can contain a co-polyester of terepthalic acid, adipic acid and butanediol, and the elastomeric layer can contain a polyurethane elastomer. The plastic layer and/or the elastomeric layer can contain filler particles, and may be present as a bilayer laminate. The plastic layer and a filled elastomeric layer can also be combined with an unfilled elastomeric layer to form a tri-layer laminate. The multilayer films can provide breathable films with improved degradability, stretchability and recoverability, and tactile feel.

25 Claims, 1 Drawing Sheet

U.S. PATENT DOCUMENTS

| | | | |
|---|---|---|---|
| 5,254,607 A | 10/1993 | McBride et al. | |
| 5,284,703 A | 2/1994 | Everhart et al. | |
| 5,391,423 A | 2/1995 | Wnuk et al. | |
| 5,407,979 A | 4/1995 | Wu et al. | |
| 5,417,679 A | 5/1995 | Toms et al. | |
| 5,691,034 A | 11/1997 | Krueger et al. | |
| 5,849,401 A * | 12/1998 | El-Afandi et al. | 428/215 |
| 5,851,937 A | 12/1998 | Wu et al. | |
| 5,869,193 A | 2/1999 | Langley | |
| 5,914,184 A * | 6/1999 | Morman | 428/315.9 |
| 5,939,467 A | 8/1999 | Wnuk et al. | |
| 5,972,473 A | 10/1999 | Arakawa et al. | |
| 6,071,450 A | 6/2000 | Topolkaraev et al. | |
| 6,117,438 A | 9/2000 | Topolkaraev et al. | |
| 6,261,674 B1 | 7/2001 | Branham et al. | |
| 6,268,048 B1 | 7/2001 | Topolkaraev et al. | |
| 6,368,710 B1 | 4/2002 | Hayes | |
| 6,451,895 B1 | 9/2002 | Topolkaraev et al. | |
| 6,509,419 B1 | 1/2003 | Balogh et al. | |
| 6,514,602 B1 | 2/2003 | Zhao et al. | |
| 6,515,075 B1 | 2/2003 | Balogh et al. | |
| 6,586,354 B1 | 7/2003 | Topolkaraev et al. | |
| 6,608,167 B1 | 8/2003 | Hayes | |
| 6,635,799 B1 | 10/2003 | Osborn, III et al. | |
| 2002/0028857 A1 | 3/2002 | Holy | |
| 2002/0076554 A1 | 6/2002 | Stopper | |
| 2002/0098341 A1 | 7/2002 | Schiffer et al. | |
| 2002/0123290 A1 | 9/2002 | Tsai et al. | |
| 2002/0143136 A1 | 10/2002 | Noda et al. | |
| 2003/0021973 A1 | 1/2003 | Topolkaraev et al. | |
| 2003/0035943 A1 | 2/2003 | Jones et al. | |
| 2003/0108701 A1 | 6/2003 | Bond et al. | |
| 2003/0236371 A1 | 12/2003 | Wilson, Jr. et al. | |
| 2004/0024101 A1 | 2/2004 | Hayes | |
| 2004/0089412 A1 | 5/2004 | Topolkaraev | |
| 2004/0091677 A1 | 5/2004 | Topolkaraev | |

FOREIGN PATENT DOCUMENTS

| | | |
|---|---|---|
| EP | 0 956 842 A1 | 11/1999 |
| EP | 0 813 401 B1 | 6/2000 |
| EP | 0 712 880 B1 | 7/2002 |
| EP | 1 254 766 A1 | 11/2002 |
| EP | 1 040 217 B1 | 3/2003 |
| EP | 1 198 338 B1 | 12/2003 |
| WO | WO 99/33651 | 7/1999 |
| WO | WO 2004/043678 A1 | 5/2004 |

OTHER PUBLICATIONS

W.J. Schrenk, T. Alrefy, Jr.; "Coextruded Multilayer Polymer Films and Sheets"; The Dow Chemical Company, 1978; 36 pages.

International Search Report for PCT/US2005/040834, dated Jul. 12, 2007, 6 pages.

International Search Report for PCT/US2005/037269, dated Jul. 12, 2007, 10 pages.

International Search Report for PCT/US2005/040834 dated Mar. 22, 2006.

* cited by examiner

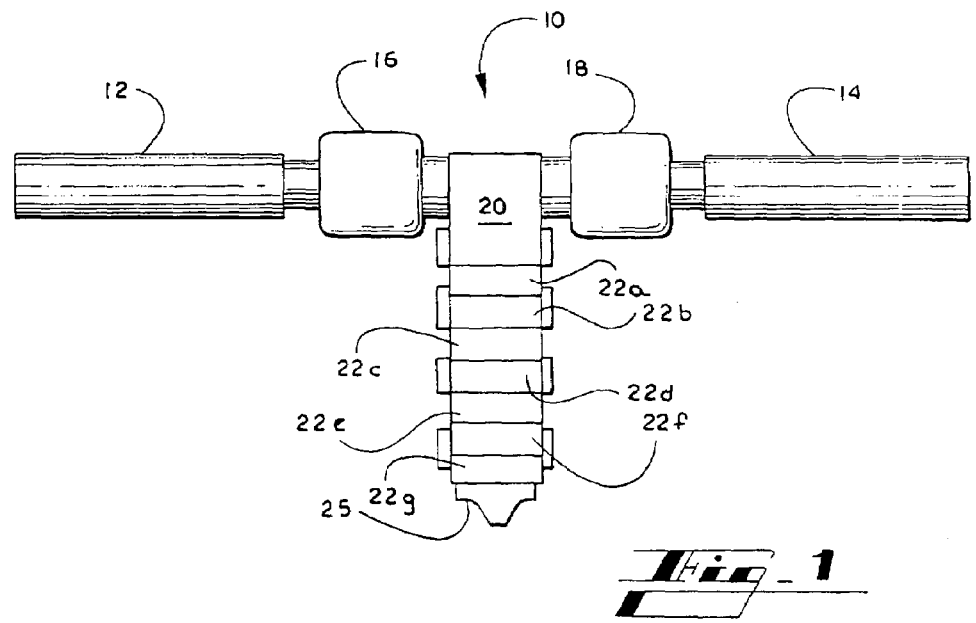
Fig_1
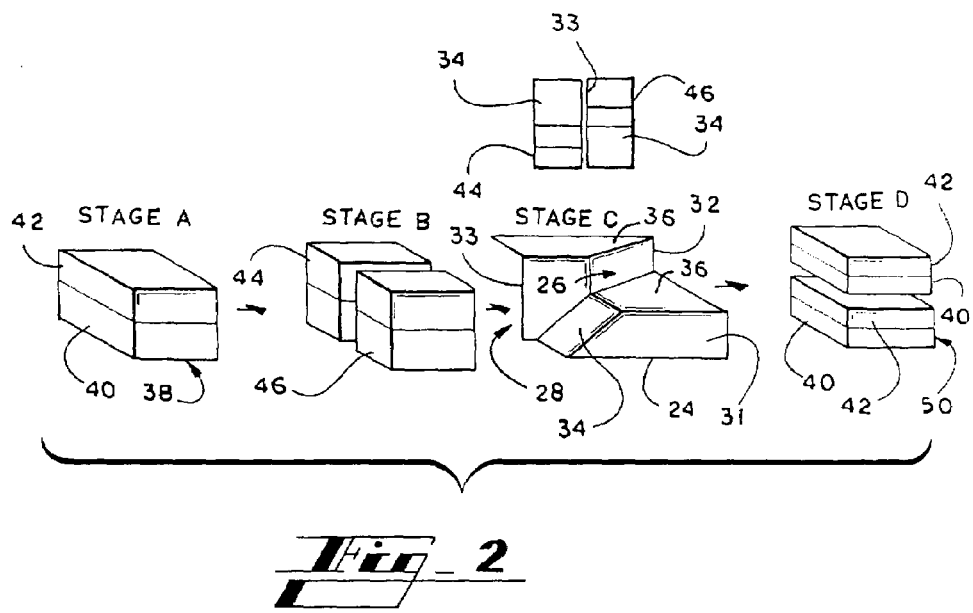
Fig_2

DEGRADABLE BREATHABLE MULTILAYER FILM WITH IMPROVED PROPERTIES AND METHOD OF MAKING SAME

BACKGROUND

Disposable absorbent products currently find wide-spread use in many applications. For example, disposable absorbent products are used in personal care products such as diapers, feminine napkins or tampons, wipes, adult incontinence products, training pants and release liners. Disposable absorbent products are also used in surgical drapes and wound dressings. A typical disposable absorbent product includes a composite structure having a liquid-permeable topsheet, a fluid acquisition layer, an absorbent structure, and a liquid-impermeable backsheet. This absorbent product can also include some type of fastening system for fitting the product onto the wearer.

The backsheet or outer cover is designed to be impermeable to liquid in order to keep the bedding or clothing of the wearer from becoming soiled. The topsheet or liner is designed to be highly permeable to liquid and to be non-irritating to the skin. Sophisticated types of liners may incorporate lotions or medicaments to improve the environment near the skin or to actually improve skin health. The absorbent core is designed to absorb and store liquids and secondarily to distribute liquids and contain solids. The core can be made with pulp and/or superabsorbent materials. These materials absorb liquids quite quickly and efficiently in order to minimize leakage. Disposable absorbent products are generally subjected to one or more liquid insults during use, such as of water, urine, menses, or blood. The topsheet and backsheet materials of disposable absorbent articles are typically made of multilayer films that exhibit sufficient strength and handling capability, so that the product retains its integrity during use by the wearer and does not allow leakage of the liquid insulting the product.

There are a number of characteristics and properties of conventional multilayer films that could be improved, especially if the basic performance characteristics and mechanical properties can be retained. Disposal of used absorbent articles is an important aspect, since solid waste disposal is becoming an ever increasing concern. It is desirable to produce multilayer films that may be efficiently disposed of after use, such as by biodegradation, hydrolytic degradation or composting. Breathability of a multilayer film in a diaper or adult incontinence garment may provide significant skin health benefits to the user wearing the diaper. Therefore, it is desirable to produce multilayer films that allow moisture vapors to pass through the topsheet, leaving the user's skin drier and less prone to diaper rash. Stretchability and recoverability of a multilayer film may be desirable, so as to provide elastic multilayer films with improved gasketing and fit. Improvement in the tactile properties of multilayer films is another area of interest. For example, softness in the topsheet of a diaper or adult incontinence garment may provide increased comfort and feel to the user wearing the diaper. Accordingly, it would be beneficial to prepare a multilayer film for personal care products having improved properties with respect to degradability, breathability, stretchability and recoverability, and tactile feel.

BRIEF SUMMARY

One aspect of the multilayer film includes a plastic layer having a co-polyester of terepthalic acid, adipic acid and butanediol, and an elastomeric layer having a polyurethane elastomer. The plastic layer and the elastomeric layer together form a bilayer laminate.

Another aspect of the multilayer film includes the method of making the multilayer film. The first stage includes extruding the plastic layer having a co-polyester of terepthalic acid, adipic acid and butanediol and extruding the elastomeric layer having a polyurethane elastomer. The second stage includes combining the plastic layer and the elastomer layer in a multilayer combining block to form a laminate. The third stage includes separating the laminate to form a pair of laminate halves where each half includes a portion of the plastic layer and a portion of the elastomeric layer. The fourth stage includes stretching the laminate halves to thin and widen the laminate halves. The fifth stage includes stacking the laminate halves to reform another laminate having alternating plastic and elastomeric layers in parallel stacking arrangement. The sixth stage includes repeating the separating, stretching and stacking stages to form a multilayer structure. The last stage includes allowing the multilayer structure to solidify into a multilayer film.

A further aspect of the multilayer film includes a plastic layer and an elastomeric layer forming a well bonded bilayer laminate. The film has an average surface roughness from about 500 to about 1,000 nanometers.

Yet a further aspect of the multilayer film includes the method of making the multilayer film. The first stage includes extruding the plastic layer and extruding the elastomeric layer. The second stage includes combining the plastic layer and the elastomer layer in a multilayer combining block to form a laminate. The third stage includes separating the laminate to form a pair of laminate halves where each half includes a portion of the plastic layer and a portion of the elastomeric layer. The fourth stage includes stretching the laminate halves to thin and widen the laminate halves. The fifth stage includes stacking the laminate halves to reform another laminate having alternating plastic and elastomeric layers in parallel stacking arrangement. The sixth stage includes repeating the separating, stretching and stacking stages to form a multilayer structure. The seventh stage includes allowing the multilayer structure to solidify into a solidified film. The last stage includes stretching the solidified film to at least three times its original length to form a multilayer film. The multilayer film is a well bonded laminate having an average surface roughness from about 500 to about 1,000 nanometers.

Yet a further aspect of the multilayer film includes an absorbent disposable article containing a body of absorbent material and a multilayer film attached to the body of the absorbent material. The absorbent disposable article may be a diaper, an adult incontinence product, a feminine care absorbent product, or a training pant.

BRIEF DESCRIPTION OF THE DRAWINGS

Many of the features and dimensions portrayed in the drawings, and in particular the presentation of layer thicknesses and the like, have been somewhat exaggerated for the sake of illustration and clarity.

FIG. 1 depicts a plan view of a coextrusion system for making a multilayer film.

FIG. 2 depicts a schematic diagram illustrating a multiplying die element and the multiplying process used in the coextrusion system illustrated in FIG. 1.

DETAILED DESCRIPTION

A multilayer film includes a plastic layer containing a co-polyester and an elastomeric layer containing a polyurethane elastomer. Multiple layers of each of the plastic layer and elastomeric layer may be configured in an alternating arrangement to form a laminate structure. The multilayer film may be breathable, allowing water vapor to pass efficiently through the film. Breathable films containing a co-polyester and a polyurethane elastomer may provide for improved properties such as degradability, stretchability and recoverability, and tactile feel.

The term "multilayer film" means a film having two or more layers that are separate and distinct from each other. In an example, a multilayer film includes a film having only one plastic layer and one elastomeric layer, configured as a bi-layer laminate unit. In another example, a multilayer film includes a film having more than one bi-layer unit arranged in a series of parallel and repeating bi-layer laminate units, such that the film alternates between plastic layers and elastomeric layers. Multilayer films enable combinations of two or more layers of normally incompatible polymers to be combined into a monolithic film with a strong coupling between the individual layers. The term "monolithic film" means a film that has multiple layers which adhere to one another and function as a single unit. Desirably, the coupling between the layers may be achieved without using compatibilizing agents, although compatibilizing agents may be used to optimize the properties of the multilayer films.

The plastic layer can include a co-polyester that is melt-extrudable, so that the co-polyester may be coextruded along with the elastomer to form a multilayer film. The term "melt-extrudable" means a material having a melt flow rate (MFR) value of not less than about 0.2 grams/10 minutes, based on ASTM D1238. Preferably, the MFR value of melt-extrudable co-polyester ranges from about 0.2 g/10 minutes to about 100 g/10 minutes, more preferably from about 0.5 g/10 minutes to about 50 g/10 minutes, and still more preferably from about 5 g/10 minutes to about 50 g/10 minutes to provide desired levels of process ability. In addition, it is desirable for the co-polyester to be stretchable in the solid state, which means the polymer can be stretched at a temperature below its melting point. Stretchability in the solid state can allow for easier processing of the multilayer film. Stretching of the multilayer film can reduce film thickness and may create porosity, thereby increasing the water vapor transport rate of the film and, hence, breathability. Stretchability of the co-polyester can be quantified by the ratio of the true tensile fracture stress to the stress at yielding, where the true tensile fracture stress is equal to the tensile force at failure divided by the cross-sectional area of the failed specimen. This ratio may be from about 1 to about 150, preferably from about 1 to about 150, more particularly from about 5 to about 100, and even more preferably from about 10 to about 50.

Examples of melt-extrudable co-polyesters include Eastar Bio® co-polyester available from Novamont (Italy), Ecoflex® co-polyester available from BASF Corporation (Mount Olive, N.J.), and EnPol® co-polyester available from Ire Chemical (Korea). A specific example of a melt-extrudable co-polyester is the aromatic-aliphatic co-polyester of terephthalic acid, adipic acid and butanediol. Other examples of melt-extrudable co-polyesters include polybutylene succinate of the Bionolle 1000 series and polybutylene succinate adipate of the Bionolle 3000 series, both available from Showa HighPolymer Co., Ltd. of Japan. This co-polyester can be linear or branched, and branched co-polyesters can include short and/or long-chain branching. The co-polyester has high elongation and low modulus. Preferably, the elongation at break of the co-polyester is from about 300 percent to about 1,000 percent. Preferably, the co-polyester is relatively soft, having a tensile modulus from about 40 MPa to about 120 MPa, and having a Shore D hardness less than about 40. Typically, the lower the modulus in the co-polyester, the softer the resultant multilayer film. Preferably, the co-polyester has a density from about 1 g/cm$^3$ to about 1.3 g/cm$^3$.

The elastomeric layer includes a polyurethane elastomer that is melt-extrudable. The term "elastomer" or "elastomeric" means a material that is stretchable and recoverable. A bi-layer laminate can be formed by co-extruding the elastomer and plastic materials. The bi-layer laminate can then be further processed, for example by separating the laminate into portions, stretching the laminate portions, and/or stacking the laminates or laminate portions to provide a multilayer laminate. The elastomeric layer may provide for confinement of the individual plastic layers, preventing the plastic layers from adhering to each other during stretching. When a precursor multilayer film is subjected to a stretching force, the elastomeric layer may also provide a contraction force to the multilayer film after the stretching force is released, thus imparting elastomeric properties to the film.

The content of the elastomer in the film may vary from about 30 percent by weight (wt %) to about 80 wt %, and preferably from about 50 wt % to about 90 wt %. Examples of breathable polyurethane elastomers include the Estane® thermoplastic polyurethanes available from Noveon, Inc. (Cleveland, Ohio), such as Estane® 58245. The film from Estane® 58245 is tacky and very soft, with a lower modulus than the Eastar Bio® co-polyester. Estane® 58245 is elastic and has high elongation, and it is also a highly breathable polymer.

Both the plastic and elastomeric layers may include a filler material. A particulate filler material may enhance water vapor permeability of the film, thereby increasing the breathability of the film relative to an unfilled film. It is believed that a particulate filler material may create discontinuities in the multilayers, thus providing pathways for water vapor to move through the film. Particulate fillers may also increase the porosity of a film, and this porosity may be further increased during stretching of the film due to debonding between the filler and the polymer. The porosity and/or discontinuities in the film ma) provide an enhanced ability of the multilayer film to absorb or immobilize fluid. The use of fillers may also allow for improved processability of the multilayer film and for reduced production cost. In addition, the presence of fillers may provide for improvements in film properties including toughness, softness, opacity, biodegradability and skin wellness. In multilayer films containing filler materials, lubricating and release agents may be used to reduce adhesion and friction at filler-polymer interface. The presence of these agents in filled multilayer films may facilitate the formation of microvoids and the development of a porous structure in the film during stretching of the film. Examples of lubricating and release agents include surface active materials, referred to as surfactants.

Filler materials may be organic or inorganic, and are desirably in a form of individual, discrete particles. Inorganic filler materials include, for example, metal oxides, metal hydroxides, metal carbonates, metal sulfates, various kinds of clay, silica, alumina, powdered metals, glass microspheres, or void-containing particles. Specific examples of inorganic filler materials include calcium carbonate, barium sulfate, sodium carbonate, magnesium carbonate, magnesium sulfate, barium carbonate, kaolin, carbon, calcium oxide, magnesium oxide, aluminum hydroxide, and titanium dioxide. Inorganic filler materials also include, for example, those having higher aspect ratios than particles, such as talc, mica and wollastonite. Organic filler materials include, for example, latex particles, particles of thermoplastic elastomers, pulp powders, wood powders, cellulose derivatives, chitin, chitozan powder, powders of highly crystalline, high melting polymers, beads of highly crosslinked polymers, organosilicone powders, and powders or particles of super absorbent polymers, such as polyacrylic acid and the like. Combinations of any of these filler materials may also be used.

The particulate filler material may be present in the multilayer film in an amount from about 0.5 wt % to about 70 wt % of the film. To prevent critical flaw formation during stretching, the average filler particle size is desirably from 1 micrometer (μm) to 3 μm, with a top cut below 10 μm. Particles greater than 10 μm may result in tearing of the film or individual layers of the film. If the average particle size is too small, the particles may not debond, and microporous layers may not be produced. For example, very fine particles of less than 0.2 μm may cause agglomeration and increase reinforcing properties. Preferably, the average particle size of the filler material does not exceed about 200 μm. More preferably the average particle size of the filler does not exceed about 50 μm. Even more preferably, the average particle size does not exceed about 5 μm; and more preferably still, does not exceed about 3 μm.

Examples of commercially available filler materials include the following:

1. SUPERMITE®, an ultrafine ground $CaCO_3$, which is available from Imerys of Atlanta, Ga. This material has a top cut particle size of about 8 μm and a mean particle size of about 1 μm and may be coated with a surfactant, such as Dow Corning 193 surfactant, before mixing with the polymer.

2. SUPERCOAT®, a coated ultrafine ground $CaCO_3$, which is available from Imerys of Atlanta, Ga. This material has a top cut particle size of about 8 μm and a mean particle size of about 1 μm.

3. OMYACARB® UF, high purity, ultrafine, wet ground $CaCO_3$, which is available from OMYA, Inc., of Proctor, Vt. This material has a top cut particle size of about 4 μm and an average particle size of about 0.7 μm and provides good processability. This filler may also be coated with a surfactant such as Dow Corning 193 surfactant before mixing with the polymer.

4. OMYA® 2SST, an ultrafine calcium carbonate surface coated with stearic acid, available from OMYA, Inc. and Micritic calcium carbonate MD 1517 available from Specialty Minerals.

The filler may also include superabsorbent particles, such as finely ground polyacrylic acid or other superabsorbent particles.

Preferably, the co-polyester in the plastic layer is filled with calcium carbonate filler particles. Examples of calcium carbonate fillers include 2SST grade $CaCO_3$ available from Omya (Proctor, Vt.). The filler loading in the plastic layer may be from about 20 wt % to about 65 wt %, preferably from about 30 wt % to about 50 wt %. In the example of calcium carbonate, the presence of a filler correlates to a decrease in elongation, an increase in the modulus, and a decrease in the strength of the co-polyester. The co-polyester can also become less tacky with the addition of calcium carbonate. Preferably, the filler particles in the plastic layer have a mean particle size in the range of 2 μm to 5 μm, more preferably in the range of 2 μm to 4 μm, and most preferably of about 2 μm.

Preferably, the polyurethane elastomer in the elastomeric layer contains calcium carbonate filler particles. The filler loading in the elastomeric layer may be from about 20 wt % to about 60 wt %, preferably from about 45 wt % to about 55 wt %. The effect of filler particles, such as calcium carbonate, on elastomer properties follows the same trends as described above for the co-polyester properties. Preferably, the filler particles in the elastomeric layer have a mean particle size in the range of 2 μm to 5 μm, more preferably in the range of 2 μm to 4 μm, and most preferably of about 2 μm.

Both the plastic and elastomeric layers may include a surfactant and/or filler wetting and filler dispersing agents. Surfactants may increase the hydrophilicity and wettability of the film, may enhance the water vapor permeability of the film, and may improve filler dispersion in the polymer. For example, one or more surfactants may be blended with the co-polyester and/or the elastomer. The particulate filler material may be combined with the surfactant before being mixed with the elastomer or the co-polyester. Surfactants or surface active materials desirably have a hydrophile-lipophile balance (HLB) number from about 6 to about 18. When the HLB number is too low, the wettability may be insufficient. When the HLB number is too high, the surface active material may have insufficient adhesion to the polymer matrix of elastomeric layer and/or non-elastomer layer, and may be too easily washed away during use. A number of commercially available surfactants may be found in *McMcutcheon's* Vol. 2; Functional Materials, 1995. Specific examples of surfactants include silicone glycol copolymers, ethylene glycol oligomers, acrylic acid, hydrogen-bonded complexes, carboxylated alcohol, ethoxylates, various ethoxylated alcohols, ethoxylated alkyl phenols, ethoxylated fatty esters, stearic acid, behenic acid, and the like, and combinations thereof. The surfactant may be present in the multilayer film in an amount from about 0.5 to about 20 wt % of the film. Preferably, the surface active material is present in the multilayer film in an amount from about 1 wt % to about 15 wt % of the film, more preferably from about 1 wt % to about 10 wt %, and even more preferably from about 2 wt % to about 12 wt %. The surfactant may be blended with one or more polymers to form a concentrate. The concentrate may be mixed or blended with polymers forming the elastomeric layers, the plastic layers or both. A filler wetting and filler dispersing agent may improve filler dispersion in a film and improve film processability. Examples of filler wetting and filler dispersing agents can be found in *Plastic Additives*, Ed. R. Gachter and H. Muller, 4th edition, 1993, Hanser Publishers.

For a multilayer film containing a filled plastic layer and a filled elastomeric layer, the film may also include an unfilled elastomeric layer containing a polyurethane elastomer. This unfilled elastomeric layer may be combined with a bi-layer laminate to form a tri-layer laminate unit. Therefore, a multilayer film may be a tri-layer laminate containing a plastic layer, a filled elastomeric layer and an unfilled elastomeric layer. In another example, a multilayer film may include a film having more than one tri-layer unit arranged in a series of parallel repeating tri-layer laminate units such that the film contains a repetitive sequence of plastic layers, filled elastomeric layers and unfilled elastomeric layers. The presence of an unfilled elastomer may provide improved barrier properties and elastic properties for the film. The content of unfilled elastomer in the film may vary from about 3 wt % to about 20 wt %, and preferably from about 5 wt % to about 15 wt %.

The plastic layers and the elastomeric layers of the multilayer film preferably adhere to one another to form a well bonded laminate structure. The term "well bonded laminate structure" means a multilayer film in which none of the layers are corrugated, and that is bonded sufficiently at the layer interfaces so that no signs of delamination are observed after the film is stretched. This provides for films with high integrity and strength, because they do not substantially delaminate or form corrugations after multilayer coextrusion. The formation of a well bonded laminate structure may be facilitated by using layers with small thicknesses. Based upon the thickness of each multilayer, the number of multilayers in the film is determined by the desired overall film thickness. A multilayer film may have a thickness prior to stretching from about 1 mil to about 10 mils, where 1 mil is equal to 0.001 inch. In one example, a film has a thickness prior to stretching of from about 1.5 mils to about 5 mils. In another example, a film has a thickness prior to stretching of from about 1.5 mils to about 3 mils. A multilayer film may have plastic and elastomeric layers totaling about 5 to about 100 in number, and in an another example about 16 to about 60 in number.

Multilayer films may be prepared by a variety of methods. The individual layers may be formed, and then combined in a laminate structure. A bi-layer or tri-layer laminate unit may be formed, and then combined with other units in a laminate structure. In one example, multilayer films may be formed by a multilayer coextrusion process, wherein two or more polymers are coextruded to form a laminate with two or more layers. This laminate is then manipulated to multiply the number of layers in the film. Thus, the breathable multilayer films may be made by coextrusion of alternating layers of plastic layers containing a co-polyester of terepthalic acid, adipic acid and butanediol and elastomeric layers containing a polyurethane elastomer.

FIG. 1 illustrates an example of a coextrusion device 10 for forming multilayer films. This device 10 includes a pair of opposed single-screw extruders 12 and 14 connected through respective metering pumps 16 and 18 to a coextrusion block 20. A plurality of multiplying elements 22a-g extends in series from the coextrusion block 20 perpendicularly to the single-screw extruders 12 and 14. Each of the multiplying elements 22a-g includes a die element 24 disposed in the melt flow passageway of the coextrusion device 10. The last multiplying element 22g is attached to a discharge nozzle 25 through which the final product extrudes. While single-screw extruders are shown, the device 10 may also use twin-screw extruders to form the films.

A schematic diagram of the coextrusion process carried out by the coextrusion device 10 is illustrated in FIG. 2. FIG. 2 also illustrates the structure of the die element 24 disposed in each of the multiplying elements 22a-g. Each die element 24 divides the melt flow passage into two passages 26 and 28 with adjacent blocks 31 and 32 separated by a dividing wall 33. Each of the blocks 31 and 32 includes a ramp 34 and an expansion platform 36. The ramps 34 of the respective die element blocks 31 and 32 slope from opposite sides of the melt flow passage toward the center of the melt flow passage. The expansion platforms 36 extend from the ramps 34 on top of one another.

To make a multilayer film using the coextrusion device 10 illustrated in FIG. 1, in the first stage, a co-polyester with or without any filler material is extruded through the first single screw extruder 12 into the coextrusion block 20 to form a plastic layer. Likewise, a polyurethane elastomer with or without any filler material is extruded through the second single screw extruder 14 into the same coextrusion block 20. In the coextrusion block 20, a two-layer melt laminate structure 38 such as that illustrated at stage A in FIG. 2 is formed with the co-polyester forming a layer on top of a layer of polyurethane elastomer.

The extruders may be made of C. W. Bradender extruders (S. Hackensack, N.J.). The temperature of the first extruder is maintained from about 108° C. to about 190° C. The temperature of the second extruder is maintained from about 150° C. to about 180° C. The relative thicknesses of the plastic layers and the elastomeric layers of the film may be controlled by varying the feed ratio of the polymers into the extruders 12 and 14, thus controlling the constituent volume fraction. In addition, one or more extruders may be added to the coextrusion device to increase the number of different polymers in the multilayer film. For example, a third extruder may be optionally used to extrude an unfilled polyurethane elastomer.

The second stage of the process includes combining the co-polyester from the first extruder 12 and the polyurethane elastomer from the second extruder 14 through the series of multiplying elements 22a-g to form a multilayer laminate with the layers alternating between the plastic layers and the elastomeric layers. In the coextrusion block 20, a two-layer melt laminate structure is formed with the co-polyester component forming a layer on top of layer of elastomer component. For example, the temperature of the combining block and multiplier is maintained at about 195° C.

The third stage of the process includes separating the laminate to form a pair of laminate halves each including a portion of the plastic layer and a portion of the elastomeric layer. As the two-layer melt laminate is extruded through the first multiplying element 22a, the dividing wall 33 of the die element 24 splits the melt laminate 38 into two halves 44 and 46 each having a layer of co-polyester and a layer of polyurethane elastomer. This is illustrated at stage B in FIG. 2. As the melt laminate 38 is split, each of the halves 44 and 46 is forced along the respective ramps 34 and out of the die element 24 along the respective expansion platforms 36. This reconfiguration of the melt laminate is illustrated at stage C in FIG. 2.

The fourth stage of the process includes stretching the laminate halves to thin and widen the laminate halves. In the fifth stage, when the melt laminate 38 exits from the die element 24, the expansion platform 36 positions the split halves 44 and 46 on top of one another to form a four-layer melt laminate 50 having, in parallel stacking arrangement, a plastic layer, an elastomeric layer, a plastic layer and an elastomeric layer. The film die may be made of a Randcastle film die (Ceder Grove, N.J.). The temperature of the film die is maintained from about 165° C. to about 175° C.

The last stage of the process includes repeating the separating, stretching and stacking stages to form a multilayer structure having a plurality of alternating plastic and elastomeric layers in parallel stacking arrangement. This is achieved by extruding the melt laminate through series of multiplying elements 22b-g to form a multilayer laminate unit with the layers alternating between the co-polyester and the polyurethane elastomer.

The multilayer structure is then allowed to solidify into a multilayer film. For example, when the melt laminate is discharged through the discharge nozzle 25 and enters a chill roll, the melt laminates form a film having from about four to about 100 multilayers, depending on the number of multiplying elements. Preferably, the multilayer film after solidification is a well bonded multilayer film.

This exemplary coextrusion device and process is described in more detail in an article Mueller et al., entitled *Novel Structures By Microlayer Extrusion-Talc-Filled PP, PC/SAN, and HDPE-LLDPE*, Polymer Engineering and Science, Vol. 37, No. 2, 1997. A similar process is described in U.S. Pat. No. 3,576,707 and U.S. Pat. No. 3,051,453, the disclosures of which are expressly incorporated herein by reference. Other processes known in the art to form multilayer film may also be employed, e.g., coextrusion processes described in W. J. Schrenk and T. Ashley, Jr., *Coextruded Multilayer Polymer Films and Sheets, Polymer Blends*, Vol. 2, Academic Press, New York (1978).

The solidified multilayer film can be stretched in the machine direction and/or cross direction to further modify properties of the film. For example, after film extrusion and solidification, the film can be incrementally stretched over a series of 4-6 individually speed-controlled rolls and collected under tension. Preferably, a multilayer film is stretched to at least 3 times its original length, more preferably at least 4 times its original length, more preferably at least 5 times its original length, and more preferably at least 7 times its original length. Films may be stretched immediately after extrusion, or the stretching can be delayed. For example, films may be stored for 40 hours or longer before stretching to allow the elastomer to set.

Breathable multilayer films having a plastic layer and an elastomeric layer can provide significant improvements in properties such as degradability, stretchability and recoverability, and/or tactile feel. The breathability of the multilayer film is quantified in terms of water vapor transmission rate (WVTR), which is a function of film thickness, multilayer composition, and amount of stretch. The WVTR is measured according to INDA (Association of the Nonwoven Fabrics Industry) standardized procedure number IST-70.4-99. The INDA procedure measures breathability in units of grams per meter squared per 24 hours ($g/m^2$-24 hrs). Herebelow breathability, or WVTR, may be normalized to 1 mil film thickness, and reported in units of grams-mils per meter squared per day ($g$-mil/$m^2$-day). A multilayer film having a plastic layer and an elastomeric layer may have a WVTR from about 500 gram mil/day meter$^2$ (g mil/day m$^2$) to about 25,000 g mil/day m$^2$. Preferably a multilayer film having a plastic layer and an elastomeric layer has a WVTR from about 1,000 g mil/day m$^2$ to about 20,000 g mil/day m$^2$.

With respect to degradability, at least one of the plastic layer and the elastomeric layer can be biodegradable or hydrolytically degradable. For example, the aromatic-aliphatic co-polyester of terephthalic acid, adipic acid and butanediol of the plastic layer is biodegradable. The polyurethane elastomer of the elastomeric layer may also be biodegradable. As used herein, the term "biodegradable" refers to a polymeric material that, when composted under standard conditions for 180 days, at least 60% of the organic carbon in the material is converted to carbon dioxide, relative to a positive reference material (cellulose=100%). The American Society for Testing and Materials (ASTM) Standard Test Method for Determining Aerobic Biodegradation of Plastic Materials Under Controlled Composting Conditions, designation D 5338, is used for this determination. Consistent with this test procedure, samples are initially incubated for 45 days; and, if significant biodegradation of the test substance is still being observed, the incubation time may be extended to 90 days or 180 days. The polyurethane elastomer may also be hydrolytically degradable, such that the polymer degrades in the presence of water, causing the film to break down into smaller pieces or to lose strength significantly. The degradability of the components of a multilayer film can provide for easier disposal of the film and of disposable articles containing the film.

With respect to stretchability and recoverability, a multilayer film having a plastic layer and an elastomeric layer may have an increased elasticity. The term "stretchability" or "stretchable" means a material that may be stretched to several hundred percent elongation when subject to a stretching force. The term "recoverability" or "recoverable" means a material that returns to approximately its original dimensions after the stretching force is removed. These elastic properties of the multilayer film can provide for improved fit of an absorbent article and, in the case of disposable garments, can provide for improved gasketing of the product to the body of the wearer. The multilayer films may be extensible to at least 50% elongation in the machine direction, and may retract to about the original length when the extension force is removed. Preferably, the multilayer films are extensible to at least 100% elongation in the machine direction and retract to about the original length when the extension force is removed. Recoverability can be measured in terms of percentage set, which is the elongation percentage at which the applied load returns to zero. A more elastic material will have a very low percentage set, while a non-elastic material would have a very high percentage set. Multilayer films may have a percentage set of less than 100%. Preferably, the multilayer films have a percentage set of less than 50%.

With respect to tactile feel properties, a multilayer film having a plastic layer and an elastomeric layer may have low modulus. Multilayer films may have moduli in the machine direction (MD) from about 1 megaPascals (MPa) to about 150 MPa. Preferably, multilayer films have MD moduli from about 10 MPa to about 120 MPa, and more preferably from about 20 MPa to about 100 MPa. Multilayer films may have moduli in the cross direction (CD) from about 1 MPa to about 125 MPa. Preferably, multilayer films have CD moduli from about 5 MPa to about 100 MPa, and more preferably from about 10 MPa to about 50 MPa.

In addition to low moduli, the multilayer films may have improved tactile feel properties due to an increase in the surface roughness relative to conventional films. It is believed that increases in surface roughness and/or in the heterogeneity of surface topography can improve the tactile properties of the film. Therefore, the films may demonstrate improved softness and hand as a result of a finely textured surface. Moreover, when the film is stretched, the low modulus and low hardness of the plastic component may enable particles to form a finely textured surface on a skin layer of the film, improving the tactile properties of the film and its softness.

Surface roughness may be quantified in a number of ways, and is measured by non-contact white-light interferometry, using a surface profiler. Surface profilers typically use two technologies to measure a wide range of surface heights. Phase-shifting interferometry (PSI) allows for measurement of smooth surfaces, while vertical-scanning interferometry (VSI) allows for measurement of rough surfaces and steps. In PSI, light reflected from a reference mirror is combined with light reflected from a sample to produce interference fringes, where the best-contrast fringe occurs at best focus. In VSI mode, a white light beam passes through a microscope objective to the sample surface. A beam splitter reflects half of the incident beam to the reference surface. The beams reflected from the sample and the reference surface combine at the beam splitter to form interference fringes. During the measurement, a reference arm containing the interferometric objective moves vertically to scan the surface at varying heights. Because white light has a short coherence length, interferences fringes are present only over a very shallow depth for each focus position. Fringe contrast at a single sample point reaches a peak as the sample is translated through focus. The system scans through focus at evenly spaced intervals as a video camera captures frames of inter ference data. As the system scans downward an interference signal for each point on the surface is recorded. Finally the vertical position corresponding to the peak of the interference signal is extracted for each point on the surface. The vertical positions can then be plotted to visually represent the surface measured in three dimensions.

The most universal parameter is average surface roughness (Ra), which is the mean height calculated over the entire array. The root mean square surface roughness (Rq) is the root mean square average of the measured height deviations taken within the evaluation area and measured from the mean linear surface. Rq is compared to Ra to calculate skewness and kurtosis. If a surface has a profile that contains no large deviations form the mean surface level, the values of Ra and Rq will be similar. If there are appreciable numbers of large bumps and holes, the largest values of the profile height function will dominate the surface statistics, and Rq will be larger than Ra. The maximum height of the surface profile (Rt) is the vertical distance between the highest and the lowest points on the evaluation area. The maximum average height of the surface profile (Rz) is the average of the greatest peak-to-valley separations.

Multilayer films may have Ra values from about 500 nanometers (nm) to about 1,000 nm. Preferably, multilayer films have Ra values from about 700 nm to about 3,000 nanometers, more preferably from about 800 nm to about 2,000 nm. Multilayer films may have Rq values from about 1,000 nm to about 3,000 nm, and preferably have Rq values from about 1,500 nm to about 2,000 nm. Multilayer films may have Rt values from about 10,000 nm to about 30,000 nm, and preferably from about 15,000 nm to about 20,000 nm. Multilayer films may have Rz values from about 10,000 nm to about 30,000 nm, and preferably from about 14,000 nm to about 20,000 nm.

Multilayer films can be used for extensible and/or elastic outercover, gasketing and other closure applications. One or more nonwoven biodegradable webs may be laminated to the film with multilayers to improve strength of the film, its tactile properties, appearance, or other beneficial properties of the film. The nonwoven webs may be spunbond webs, meltblown webs, bonded carded webs, airlaid or wetlaid webs, or other nonwoven webs known in the art. Lamination may be accomplished using thermal or adhesive bonding as known in the art. Thermal bonding may be accomplished by, for example, point bonding. The adhesive may be applied by, for example, melt spraying, printing or meltblowing. Various types of adhesives are available including those produced from amorphous polyalphaolefins and ethylene vinyl acetate-based hot melts. Multilayer films may be used as a backsheet in absorbent personal care items including diapers, adult incontinence products, feminine care absorbent products, training pants, and health care products such as wound dressing. The films can also be used to make medical articles such as medical garments, aprons, underpads, badages, wipes, surgical drapes, surgical gowns and other disposable garments.

The multilayer films are further illustrated by the following examples, which are not to be construed in any way as imposing limitations upon the scope thereof. On the contrary, it is to be clearly understood that resort may be had to various other examples, modifications, and equivalents thereof which, after reading the description herein, may suggest themselves to those skilled in the art without departing from the spirit of the specification and/or the scope of the appended claims.

EXAMPLES

Example 1

Formation of Multilayer Films

Five and 17-layer films consisting of $CaCO_3$ filled Eastar Bio® and Estane® polymers were created using a microlayer extrusion setup. The Eastar Bio® contained 40 wt % $CaCO_3$, and the Estane® 58245 contained 50 wt % $CaCO_3$. In each polymer, the $CaCO_3$ was Omya 2SST, having an average diameter of 2 µm. The setup consisted of C. W. Brabender (S. Hackensack, N.J.) extruders, flexible high-pressure polymer hoses, a polymer melt combining block, layer multiplier dies, a Randcastle (Cedar Grove, N.J.) film die, and a chill roll.

The first stage included extruding the plastic layer and extruding the elastomeric layer. The temperature of the first extruder was maintained from about 108° C. to about 190° C. The temperature of the second extruder was maintained from about 150° C. to about 180° C. The extruded layers were then passed to a spin pump through a two-foot flexible hose and subsequent to a combining block through an eight-foot flexible hose. The hose temperature was maintained at about 190° C. The second stage included combining the plastic layer and the elastomer layer in a multilayer combining block to form a laminate. The third stage included separating the laminate to form a pair of laminate halves where each half included a portion of the plastic layer and a portion of the elastomeric layer. The temperature of the combining block and multiplier was maintained at about 195° C. The fourth stage included stretching the laminate halves to thin and widen the laminate halves. The fifth stage included stacking the laminate halves to reform another laminate having alternating plastic and elastomeric layers in parallel stacking arrangement. The temperature of the film die was maintained from about 165° C. to about 175° C. The last stage included repeating the separating, stretching and stacking stages to form a multilayer film.

After film extrusion and collection, the film was incrementally stretched over a series of 4-6 individually speed-controlled rolls and collected under tension. The films were stretched in the machine direction (MD) for various stretch ratios. Stretch ratio is measured by the amount the film that is stretched in the machine direction relative to its original length. For example, the films were stretch 4, 5, or 7 times of its original length. Some films were stretched immediately after extrusion, while some films were stored for 40 hours or longer before stretching, to allow the elastomer to set. The details of the composition and processing of the multilayer films are provided in Table 1 below. The control (Film #1) was a breathable polyethylene film filled with $CaCO_3$ and stretched 4 times in the machine direction. The relative amounts of the individual layers in the film are listed in volume percent (vol %).

TABLE 1

Multilayer Films

| Film # | Estane ® (vol %) | Eastar Bio ® (vol %) | Layers | Stretch Ratio | Stretch Delay (hrs) | Initial Thickness (mil) |
|---|---|---|---|---|---|---|
| 1 | CONTROL—Polyethylene | | | 4 | | |
| 2 | 50 | 50 | 5 | 5 | 0 | 1.0 |
| 3 | 50 | 50 | 5 | 7 | 0 | 1.0 |
| 4 | 50 | 50 | 5 | 5 | 40 | 1.0 |
| 5 | 50 | 50 | 5 | 7 | >40 | 1.0 |
| 6 | 50 | 50 | 5 | 5 | 0 | 1.5 |

TABLE 1-continued

Multilayer Films

| Film # | Estane ® (vol %) | Eastar Bio ® (vol %) | Layers | Stretch Ratio | Stretch Delay (hrs) | Initial Thickness (mil) |
|---|---|---|---|---|---|---|
| 7 | 50 | 50 | 5 | 7 | 0 | 1.5 |
| 8 | 50 | 50 | 5 | 4 | 40 | 1.5 |
| 9 | 50 | 50 | 5 | 5 | 40 | 1.5 |
| 10 | 50 | 50 | 5 | 7 | 40 | 1.5 |
| 11 | 60 | 40 | 5 | 5 | 0 | 1.5 |
| 12 | 60 | 40 | 5 | 7 | 0 | 1.5 |
| 13 | 70 | 30 | 5 | 5 | 0 | 1.0 |
| 14 | 70 | 30 | 5 | 7 | 0 | 1.0 |
| 15 | 70 | 30 | 5 | 5 | 0 | 1.5 |
| 16 | 70 | 30 | 5 | 5 | >40 | 1.5 |
| 17 | 70 | 30 | 5 | 7 | >40 | 1.5 |
| 18 | 50 | 50 | 17 | 4 | 0 | 2.2 |
| 19 | 50 | 50 | 17 | 5 | 0 | 2.2 |
| 20 | 50 | 50 | 17 | 7 | 0 | 2.2 |
| 21 | 70 | 30 | 17 | 7 | 0 | 2.2 |
| 22 | 50 | 50 | 17 | | | |
| 23 | 50* | 50* | 17 | | | |
| 24 | 50 | 50 | 17 | | | |
| 25 | 50* | 50* | 17 | | | |

*CaCO$_3$ from Imerys, average diameter of 3 μm

Example 2

Tensile Testing

The tensile properties of the multilayer films were measured using a MTS Sintech tensile tester (SINTECH 1/D) and TestWorks 4.05B software, according to ASTM test method D 882-97. A conventional 2.5 in-long "dogbone" sample was used, with the thin section measuring 18 mm long and 3 mm wide. The average thickness of each specimen was entered into the software program prior to testing. The samples were stretched until failure at a rate of 5 inch per minute. The measured tensile properties for the multilayer films of Example 1 are provided in Table 2 below.

TABLE 2

Tensile Properties of Multilayer Films

| | MD | | CD | |
|---|---|---|---|---|
| Film # | Strain (%) | Modulus (MPa) | Strain (%) | Modulus (MPa) |
| 1 | 117 | 142 | 321 | 124 |
| 2 | 95 | 80 | 530 | 38 |
| 3 | 63 | 91 | 415 | 30 |
| 4 | 303 | 45 | 372 | 36 |
| 5 | 204 | 35 | 417 | 37 |
| 6 | 77 | 81 | 489 | 45 |
| 7 | 49 | 92 | 532 | 37 |
| 8 | 177 | 48 | 517 | 44 |
| 9 | 192 | 46 | 329 | 37 |
| 10 | 69 | 80 | 369 | 34 |
| 11 | 184 | 40 | 449 | 52 |
| 12 | 124 | 47 | 520 | 32 |
| 13 | 286 | 27 | 381 | 20 |
| 14 | 84 | 43 | 424 | 18 |
| 15 | 97 | 62 | 456 | 24 |
| 16 | 239 | 30 | 514 | 33 |
| 17 | 128 | 39 | 442 | 23 |
| 18 | 283 | 96 | | |
| 19 | 204 | 100 | | |
| 20 | 94 | 105 | | |
| 21 | 269 | 68 | | |

The multilayer films all exhibited much lower moduli than the control polyethylene film (Film #1). A lower modulus correlates with increased softness of the film. In addition, many of the multilayer films were much more extensible than the control in both the machine direction and the cross direction, as measured by the percentage strain, which is equivalent to percentage elongation.

Example 3

Elasticity Testing

Multilayer films from Example 1 were subjected to a plurality of stretching operations. Elasticity of the film is useful to determine the extensibility tension of the film. The multilayer films were stretched to 100 percent elongation, relaxed back to zero percent, then stretched again to 100 percent and relaxed. This stretch-relax cycle was repeated five times. During the test, the load was measured, and the load at 50 percent elongation was measured on both the first and second cycle. Preferably, a multilayer film has a load below 500 grams on the second cycle, as this indicates a low extensibility tension. In addition, the percentage set was measured. The "percentage set" means the elongation at which the load returns to zero. A more elastic material will have a very low percentage set, while a non-elastic material would have a very high percentage set. The data showed that the higher the level of elastic polyurethane, the lower the percent set. The measured elasticity data are provided in Table 3 below. The designation of n/a for a value indicates that the film could not be stretched to 100 percent. It is noted that, not only could the control polyethylene sample (Film #1) not be stretched to 100 percent, it also exhibited no recovery when stretched to any elongation.

TABLE 3

Elasticity Properties of Multilayer Films

| | MD | | | CD | | |
|---|---|---|---|---|---|---|
| | Load @ 50% (grams-force) | | | Load @ 50% (grams-force) | | |
| Film # | 1$^{st}$ cycle | 2$^{nd}$ cycle | % Set | 1st cycle | 2nd cycle | % Set |
| 1 | n/a | n/a | n/a | n/a | n/a | n/a |
| 2 | n/a | n/a | n/a | n/a | n/a | n/a |
| 3 | 2673 | n/a | n/a | 144 | 8 | 89% |
| 4 | 1401 | 295 | 46% | 440 | 78 | 82% |
| 5 | 1685 | 310 | 47% | 313 | 27 | 77% |
| 6 | 3145 | 372 | 49% | 343 | 17 | 82% |
| 7 | 3811 | n/a | n/a | n/a | n/a | n/a |
| 8 | 2484 | 445 | 47% | 519 | 51 | 77% |
| 9 | 2979 | 443 | 48% | 407 | 23 | 76% |
| 10 | 3968 | n/a | n/a | 218 | 6 | 87% |
| 11 | 2223 | 539 | 35% | 419 | 97 | 73% |
| 12 | 2453 | 543 | 31% | 309 | 57 | 80% |
| 13 | 1535 | 321 | 27% | 196 | 59 | 83% |
| 14 | 1274 | 372 | 28% | 231 | 72 | 82% |
| 15 | 2979 | n/a | n/a | 225 | 9 | 86% |
| 16 | n/a | n/a | n/a | 214 | 56 | 83% |
| 17 | 3205 | 545 | 25% | 240 | 69 | 82% |

Example 4

Surface Roughness Measurements

Control Film #1 (polyethylene; stretched 4 times) and Film #14 (70/30 Eastan®/Eastar Bio®; 5-layer film; stretched 7 times) were analyzed for their surface topographies. These measurements were obtained by non-contact white-light interferometry using a WYKO NT2000 non-contact optical surface profiler. Ten areas on each film were analyzed by scanning white light interference microscopy (SWLIM) to measure and compare surface roughness. Effects of single spurious peaks were averaged out. The measured mean values of Ra, Rq. Rt and Rz are given in Table 4 below.

TABLE 4

Surface Roughness Measurements

| Film # | Ra (mean, nm) | Rq (mean, nm) | Rt (mean, nm) | Rz (mean, nm) |
|---|---|---|---|---|
| 1 | 280.5 | 387.2 | 7110.2 | 5698.4 |
| 14 | 1218.2 | 1556.4 | 16784.5 | 14559.5 |

The Ra of the degradable breathable film was about four times higher than that of the breathable polyethylene film. The Rq of the degradable breathable film was about four times higher than that of the breathable polyethylene film. The Rz of the degradable breathable film was about two times higher than that of the breathable polyethylene film. This higher micro-roughness of the degradable film surface translates into a softer feel and improved hand.

Example 5

Biodegradation Testing

The degradation of Film nos. 7, 13 and 18 were measured using the composting test, which is similar to ASTM D5338. The compost was made of 1" by 5" strip of fresh paper waste mixed with sawdust, vegetable scraps and topsoils, and was maintained at around 60° C. and 45% moisture over a six to ten week period. Films were pulled out weekly from the compost and tested for strength and extensability at a strain rate of 100 percent per minute. The measurements of the decline in mechanical properties for these films are given in Table 5 below.

TABLE 5

Degradation of Multilayer Films

| Film # | Time | Peak Load | Modulus | % Strain at break |
|---|---|---|---|---|
| 7 | 13 weeks | −75.96% | −50.19% | −70.00% |
| 13 | 13 weeks | −60.83% | −17.37% | −83.39% |
| 18 | 8 weeks | −70.75% | −48.98% | −83.89% |

The films lost approximately 70% to 80% of their total extensibility during the duration of the tests. In the 17-layer film (#18), peak load decreased from 1150 grams-force to 181 grams-force over a 6-week period. The 17 layer films degraded faster compared to 5-layer film, possibly as a result of having thinner individual layers. By alternating biodegradable layers and elastomeric layers, the overall degradation of the film is improved when the film is in contact with biligically active environment. Moreover, the degradation can be enhanced by reducing the thickness of the polyurethane layers. Therefore, stretching operations may enhance degradability of the film.

Example 6

Breathability Testing

The breathability of the multilayer film is expressed as water vapor transmission rate (WVTR). The WVTR is a function of film thickness, multilayer composition, and amount of stretch. WVTR values were measured for some of the multilayer films of Example 1, using a Permatran-W Model 100K manufactured by Mocon/Modern Controls, Inc (Minneapolis, Minn.), according to the INDA standard procedure number IST-70.4-99, which is incorporated herein by reference. The data are listed in Table 6 below, with WVTR data normalized to 1 mil film thickness.

TABLE 6

Breathability of Multilayer Films

| Film # | Thickness (mil) | WVTR (g mil/day m$^2$) |
|---|---|---|
| 4 | 0.94 | 4365 |
| 6 | 0.63 | 5056 |
| 8 | 1.09 | 3369 |
| 9 | 0.93 | 3909 |
| 10 | 0.84 | 3424 |
| 11 | 1.11 | 3474 |
| 13 | 0.94 | 5128 |
| 15 | 0.84 | 5179 |
| 16 | 1.14 | 3265 |
| 22 | 0.5 | 5100 |
| 23 | 0.5 | 4300 |
| 24 | 0.9 | 4500 |
| 25 | 0.9 | 4000 |

Example 7

Composition of Tri-Layer Laminate Multilayer Films

Multilayer films based on tri-layer laminates were formed, following the procedure in Example 1, adapted for three polymer compositions. Each of the films had a skin layer of pure Estane® 58245 with no added filler. For Film Nos. 31-34, one of the layers was a dry blend of Estane® and Eastar Bio®. The details of the composition of the films are given in Table 7 below. In this table, the composition of the individual layers is given in weight percent (wt %), whereas the relative amounts of the layers in the overall film are given in volume percent (vol %).

TABLE 7

Composition of Tri-Layer Containing Films

| Film # | A | vol % | B | vol % | C | vol % | Layers |
|---|---|---|---|---|---|---|---|
| 26 | Estane ® | 10 | Estane ® + 55 wt % filler | 40 | Eastar Bio ® + 40 wt % filler | 50 | 9 |
| 27 | Estane ® | 20 | Estane ® + 55 wt % filler | 30 | Eastar Bio ® + 40 wt % filler | 50 | 9 |
| 28 | Estane ® | 30 | Estane ® + 55 wt % filler | 20 | Eastar Bio ® + 40 wt % filler | 50 | 9 |

TABLE 7-continued

Composition of Tri-Layer Containing Films

| Film # | A | vol % | B | vol % | C | vol % | Layers |
|---|---|---|---|---|---|---|---|
| 29 | Estane ® | 25 | Eastar Bio ® + 40 wt % filler | 50 | Estane ® | 25 | 3 |
| 30 | Estane ® | 15 | Eastar Bio ® + 40 wt % filler | 70 | Estane ® | 15 | 3 |
| 31 | Estane ® | 25 | 23% Estane ® + 46% Eastar Bio ® + 31% filler | 50 | Estane ® | 25 | 3 |
| 32 | Estane ® | 15 | 23% Estane ® + 46% Eastar Bio ® + 31% filler | 70 | Estane ® | 15 | 3 |
| 33 | Estane ® | 25 | 38% Estane ® + 38% Eastar Bio ® + 24% filler | 50 | Estane ® | 25 | 3 |
| 34 | Estane ® | 15 | 38% Estane ® + 38% Eastar Bio ® + 24% filler | 70 | Estane ® | 15 | 3 |

Example 8

Properties of Tri-Layer Laminate Multilayer Films

The breathabilities of the multilayer films of Example 7 were measured using the technique described in Example 6. The data are listed in Table 8 below.

TABLE 8

Properties of Tri-Layer Containing Films

| Film # | Stretched Thickness (mil) | Mocon (g mil/day m$^2$) |
|---|---|---|
| 26 | 0.8 mil | 4000 |
| 27 | 0.5 mil | 4900 |
| 28 | 0.5 mil | 5200 |
| 29 | 1.0 mil | 2500 |
| 30 | 1.0 mil | 2400 |
| 31 | 1.0 mil | 2500 |
| 32 | 1.0 mil | 2400 |
| 33 | 1.0 mil | 2500 |
| 34 | 1.0 mil | 2500 |

There is a wide range of film compositions that can be tailored for certain film properties such as barrier, without sacrificing breathability. The results for Film Nos. 26-28 show that adding more volume to the pure Estane® skin layers increases breathability, and also that the polyurethane layers can also be filled with CaCO$_3$ without hurting film properties, including monolithic-like layer adhesion. The results for Film Nos. 29-34 show that Estane® and filled Eastar Bio® can be dry blended during film casting, have added Estane® skin layers, and still provide breathability. Having unfilled layers of Estane® in the film composition can significantly improve barrier properties of the film and can enhance elastic properties of the material.

While the preferred examples of the multilayer film have been described, it should be understood that the multilayer film is not so limited and modifications may be made. The scope of the multilayer film is defined by the appended claims, and all devices that come within the meaning of the claims, either literally or by equivalence, are intended to be embraced therein.

What is claimed is:

1. A multilayer film, comprising:
   a plurality of plastic layers comprising a co-polyester of terephthalic acid, adipic acid and butanediol; and
   a plurality of elastomeric layers comprising a polyurethane elastomer having a tensile modulus from about 40 MPa to about 120 MPa,
   wherein the film has a breathability of about 3,000 g mil/day m$^2$ to about 20,000 g mil/day m$^2$,
   wherein the plastic layers and the elastomeric layers are separate and distinct from each other in an alternating arrangement with one another and wherein the film comprises a well bonded laminate structure, and
   wherein the film has a surface roughness avenge of about 500 to about 1,000 nanometers.

2. The film of claim 1, wherein at least one of the plastic layer and the elastomeric layer further comprises from about 20 weight percent to about 65 weight percent filler particles.

3. The film of claim 2, wherein the filler particles comprise calcium carbonate having a mean particle size from about 2 micrometers to about 5 micrometers.

4. The film of claim 3, wherein the elastomeric layer is a filled elastomeric layer comprising from about 20 weight percent to about 65 weight percent filler particles;
   the film further comprising an unfilled elastomeric layer comprising a polyurethane elastomer,
   wherein the plastic layer, the filled elastomeric layer and the unfilled elastomeric layer together form a trilayer laminate.

5. The film of claim 4, further comprising a plurality of trilayer laminates.

6. The film of claim 4, wherein each of the plastic layers alternates with either of the elastomeric layers and the film comprises a well bonded laminate structure.

7. The film of claim 4, wherein the filled elastomeric layer is present in the film at a level of about 30 weight percent to about 80 weight percent, and the unfilled elastomeric layer is present in the film at a level of about 3 weight percent to about 20 weight percent.

8. The film of claim 1, wherein the elastomeric layer is present in the film at a level of about 30 weight percent to about 80 weight percent.

9. The film of claim 1, wherein at least one of the co-polyester and the polyurethane elastomer is biodegradable.

10. The film of claim 9, wherein the polyurethane elastomer is hydrolytically degradable.

11. The film of claim 1, wherein the film has a thickness between about 1.5 and about 3.0 mil.

12. The film of claim 1, wherein the film has a tensile modulus in the machine direction from about 10 MPa to about 120 MPa.

13. The film of claim 1, wherein the film has a percent set in the machine direction of less than about 100 percent.

14. An absorbent disposable article, comprising a body of absorbent material, and a multilayer film of claim 1 attached to the body of the absorbent material.

15. The absorbent disposable article of claim 14, wherein the absorbent disposable article is selected from a diaper, an adult incontinence product, a feminine care absorbent product, and a training pant.

16. The film of claim 1, wherein each of the plastic layer and the elastomeric layer further comprises from about 20 weight percent to about 65 weight percent filler particles having a mean particle size from about 2 to about 4 micrometers.

17. The film of claim 1, wherein the film has a thickness between about 0.5 and about 1.2 mil.

18. The film of claim 1, wherein the film comprises between about 5 to about 100 layers.

19. The film of claim 1, wherein the film comprises between 5 to 17 layers.

20. The film of claim 19, wherein the film has a thickness between about 0.5 and about 1.2 mil.

21. A stretched multilayer film, comprising:
A plurality of plastic layers and a plurality of elastomeric polyurethane layers separate and distinct from each other in an alternating arrangement and forming a well-bonded laminate structure;
wherein each plastic layer comprises a co-polyester of terepthalic acid, adipic acid and butanediol;
wherein the elastomeric polyurethane has a tensile modulus from about 40 MPa to about 120 MPa;
wherein at least one of each of the plastic and elastomeric polyurethane layers comprises filler particles;
wherein none of the layers are corrugated and the film has a tensile modulus in the machine direction from about 10 to about 120 MPa, and
wherein the film has a surface roughness average of about 500 to about 1,000 nanometers.

22. The stretched film of claim 21, wherein the stretched film comprises between 3 and 17 layers and has a thickness between about 0.5 and about 1.2 mil.

23. The stretched film of claim 21, wherein the filler particles have a mean particle size from about 2 to about 4 micrometers.

24. A stretched multilayer film comprising:
a plurality of trilayer laminates comprising:
a plastic layer comprising a co-polyester of terepthalic acid, adipic acid and butanediol;
a filled elastomeric polyurethane layer comprising from about 20 weight percent to about 65 weight percent filler particles; and
a filled elastomeric polyurethane layer not having filler particles;
wherein the stretched multilayer film has a thickness between about 0.5 and about 1.2 mil, and wherein the plastic layers and the elastomeric layers are in an alternating arrangement with one another and separate and distinct from each other and wherein the film comprises a well bonded laminate structure, wherein the film has a surface roughness average of about 500 to about 1,000 nanometers and wherein the elastomeric polyurethane has a tensile modulus from about 40 MPa to about 120 MPa.

25. The stretched film of claim 24, wherein the filler particles have a mean particle size from about 2 to about 4 micrometers.

* * * * *